Dec. 1, 1970    R. A. HOLDEN    3,543,618
TOOL HOLDER
Filed Aug. 6, 1968    2 Sheets-Sheet 1
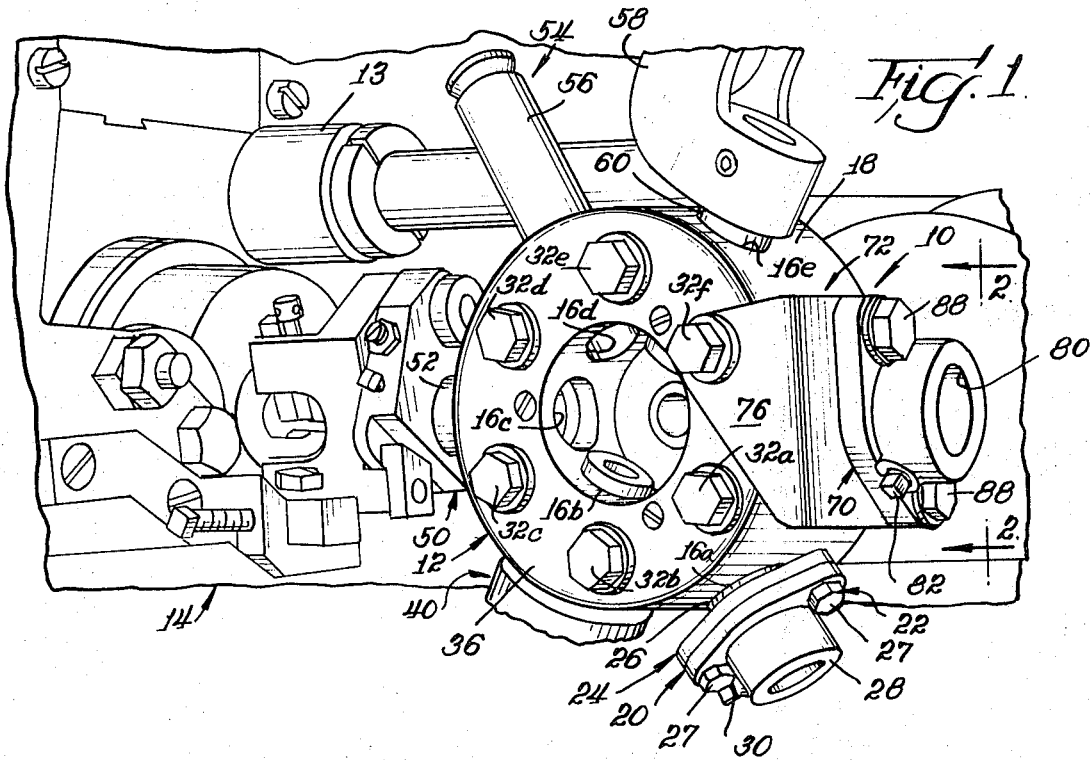
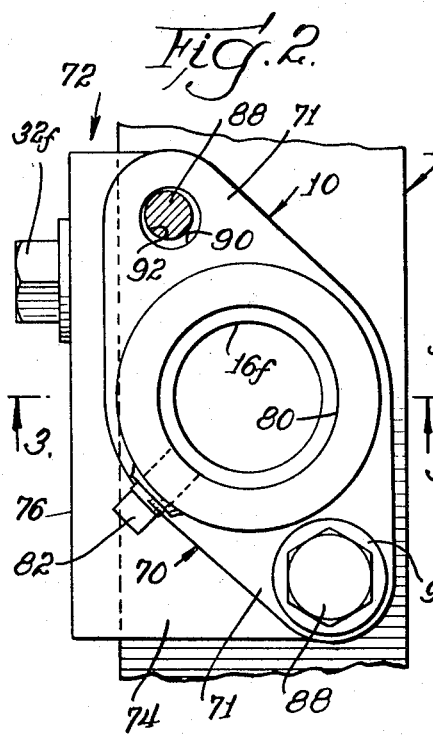
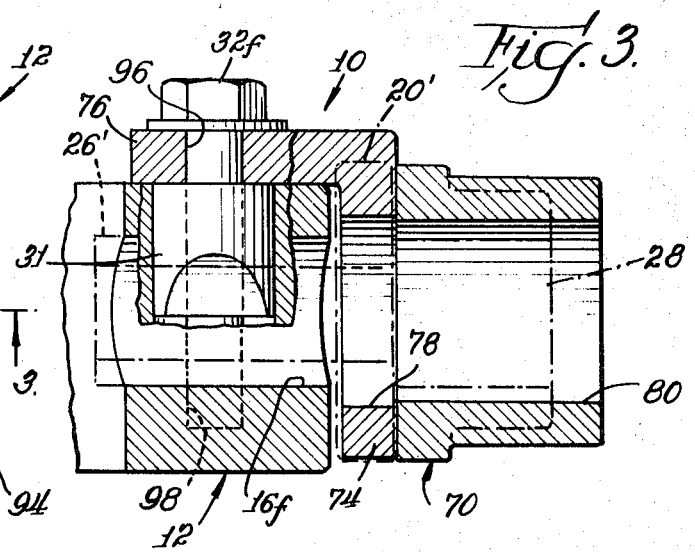
Inventor
Richard A. Holden
By Brown, Jackson, Boettcher & Dienner
Attys.

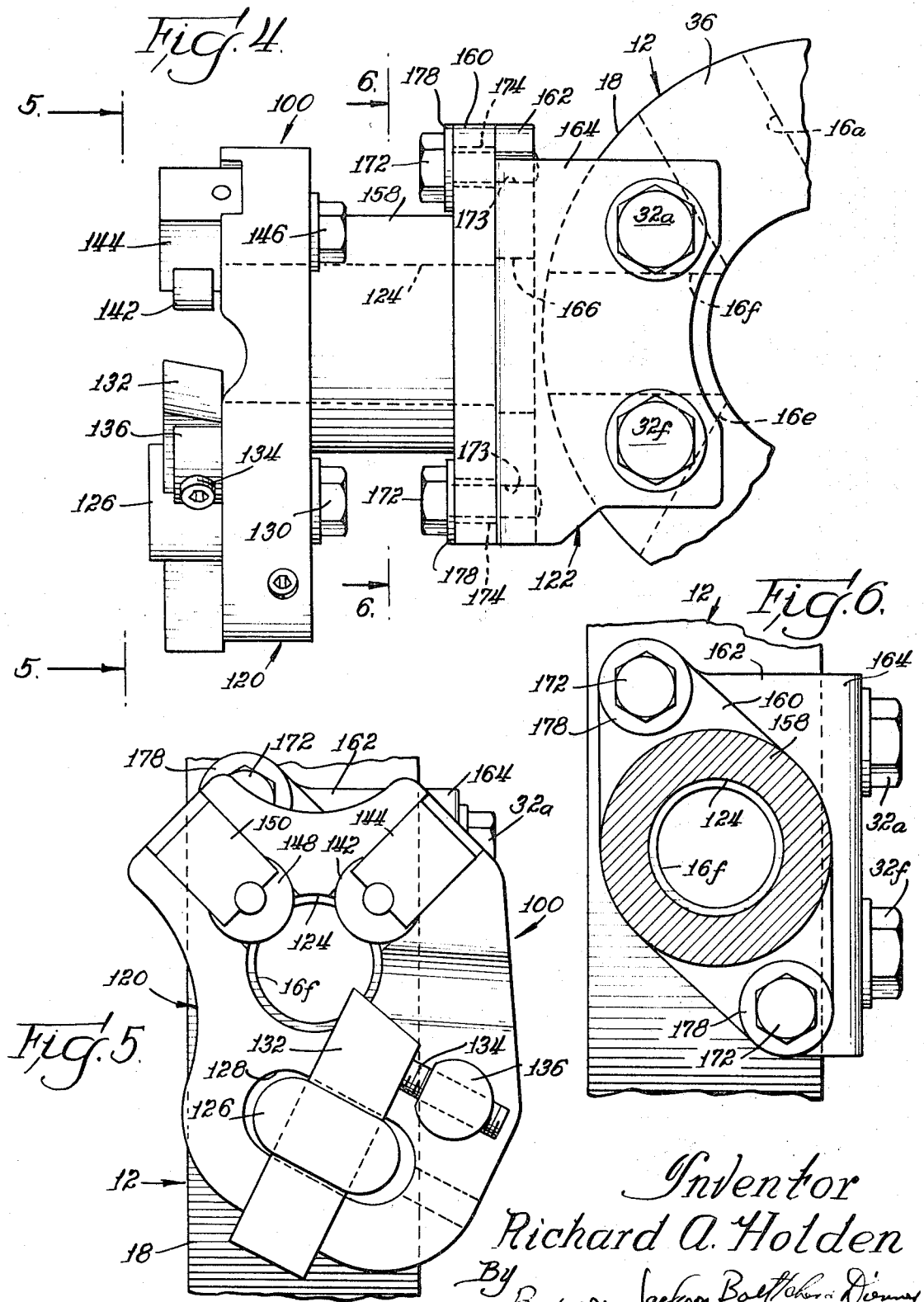

3,543,618
TOOL HOLDER
Richard A. Holden, 3853 W. 70th St.,
Chicago, Ill. 60629
Filed Aug. 6, 1968, Ser. No. 750,587
Int. Cl. B23b *29/12*
U.S. Cl. 82—36          6 Claims

ABSTRACT OF THE DISCLOSURE

Tool holders for screw machines and turret latches which are mounted on the turret head of said machines using the actuating bolts in the base of the turret head and in a way such that the tool held by the holder is aligned over the radial socket of the face of the turret head but without depending on a shank of the tool seating in the radial socket to support it.

---

This invention relates generally to turret latches, screw machines and other machine tools of the type which utilize a turret for holding several cutting tools, the turret being rotatable in order to present said tools individually for machining either bar stock or chuck work supported in the machine. More specifically, the invention pertains to novel means which may be mounted on the turret of the machine tool so as to adapt it for supporting a wide range of tools, and particularly to adapt the machine for working with larger sized tools.

In the usual machine tool employing a turret for supporting a plurality of tools, the current is positioned so that it rotates either in the plane of or at least parallel to the plane in which the stock is fed in order to be positioned to work thereon. Customarily the work is supported by chucks in a turret lathe and the turret is rotated in order to selectively or sequentially machine work held in the chuck. Screw machines, on the other hand, usually are provided with collets to hold the bar stock from which parts are machined, in many instances the bar stock feeding through the turret supported tool itself. Many screw machines also may be set up for chucking work. The operation of such machine tools is well known and generally similar; thus while the discussion hereinafter is to a great extent related to turret lathes and screw machines, unless the context requires otherwise, such discussion may be and should be considered as applying generally to machine tools having turrets.

Conventionally, the turret head of such machines contain a plurality of radially directed sockets of a given uniform diameter. These sockets are arranged and equally spaced about the face of the turret (usually cylindrical) and receive the shank of a tool holder to be supported on the turret head. In the case of a screw machine these sockets are usually arranged in radially opposed pairs such that each pair can form a continuous bore for the passage of bar stock through the turret head. Conventionally, the shank of the tool or its holder slidably fits in a respective radial socket and is locked there in place by tightening a removable locking bolt which threads into a suitable threaded opening in the exposed base or side wall of the turret head to actuate a cam or other internally located locking element which thereby engages the shank of the tool or holder seating in the associated one of the radial sockets. Conventionally, one removably locking bolt is associated with each radial socket and each of said removable locking bolts is accessible from the exposed base of the turret head.

Customarily, the radial sockets of a given turret head are of a uniform constant diameter to receive the shanks of tools or their holders scaled to the expected utility of the turret lathe or screw machine. The turret head is normally installed as a permanent integral part of the machine and cannot easily be interchanged with other turrent heads having radial sockets of different diameters. Of consequence, in the past, the use of individual turret machines have been confined to a particular size range of tools and those for which the machine was originally intended by the manufacturer.

However, on occasion, there is need to be able to use the machine to work with a drill, reamer, cutting bit or other tool of a larger size. In many instances these larger sized tools will have been designed for a larger diametered turret, or at least a turret in which the diameter of its radial sockets exceeds the inner diameter of the sockets on the specific machine available for the job. Of consequence, the larger diametered shanks of these tools and/or their holders will not fit within the radial sockets of the turret head of the available machine.

There are also occasions when the machine operator may want to use his machine to work on bar stock of a size larger than the inner diameter of the tubular mounting shank of the particular tool or tools or holders with which his machine is provided.

Accordingly it is the principal object of this invention to provide means in the form of a tool holder or an adapter which may be utilized to mount such larger sized tools on the turret head of the turret lathe screw machine or the like in a required aligned relation with respect to a particular radial socket on the turret head, but without the necessity or need to rely on the shank of the larger sized tool or its holder seating within the radial socket of the machine tool turret head to support it thereon.

A feature of the invention is that such adapters and/or holders are adapted to support and firmly hold said outsized tools in the required aligned relation with the elected radial socket of the turret head.

Still other features of the invention are that the tool holders or adapters therefor comprising the invention are both simple and inexpensive to manufactutre and may be readily mounted on the turret head without requiring any particular modification of the turret head. For example, it is contemplated that these adapters will include a supporting portion held in aligned relation over a given radial socket by means of a flange which fastens to the side wall or exposed base of the turret head by means of the removable bolts which are utilized in the normal operation of the turret to support shank mounted tools or holders therefor.

In its preferred form, tool holders and/or adapters therefor in accordance with the invention include a tubular part which aligns with the radial socket of the turret over which it is mounted but does not extend into the radial socket itself. The inner diameter of said tubular part or opening therethrough is made at least as large as the inner diameter of the radial socket wherefore the bar stock may be fed through the turret having an outer diameter up to that of the inner diameter of the radial socket.

Preferably the apertured or tubular part of the adapter or tool holder will rest on the cylindrical face of the turret head in tangential relation thereto. This provides an exceedingly stable mounting for the tool. However, it is also possible to lengthen the mounting flange of the tool holder adapter in order to locate the overlying aperture or tubular part of the holder spaced off the face of the turret head. This makes it possible for even larger sized bar stock to be fed through the tool holder, the only limitation on the cross section of the bar stock being the inner diameter of the opening through the holder or the tool supported therein and the height at which the holder or tool is spaced over the turret head face. These also represent further advantages and/or features of the present invention.

Many other advantages and/or features and objects of the invention will be at once apparent or will become so upon consideration of the following description of two presently preferred embodiments of the invention.

Referring therefore now to the drawings:

FIG. 1 is a perspective view of a fragmentary portion of a screw machine having a turret head of conventional construction useful for supporting a plurality of cutting tools and shown provided with an adapter or tool holder in accordance with the present invention;

FIG. 2 is an end elevational view taken along lines 2—2 of FIG. 1 looking in the direction of the arrows and showing details of the holder constituting the invention;

FIG. 3 is a sectional view of the holder when mounted on the turret and is taken along lines 3—3 of FIG. 2 looking in the direction indicated by the arrows;

FIG. 4 is a side elevational view of a second form of the invention showing a box tool mounted thereby on the turret head;

FIG. 5 is an end elevational view of the box tool and its holder taken along lines 5—5 of FIG. 4 looking in the direction of the arrows; and FIG. 6 is a sectional view thereof taken along lines 6—6 of FIG. 4 looking in the direction indicated by the arrows:

Referring now more particularly to the several views wherein like parts are identified by like reference numerals, FIG. 1 indicates generally at 10 a tool holder or adapter constituting a first presently preferred embodiment of the invention. Holder 10 is shown carrier by the turret head 12 of a typical screw machine 14 and so as to adapt the turret head to hold a larger size cutting tool, for example a drill bit, reamer or die. Only fragmentary portions of the screw machine 14 are shown in these views. Details of the construction and operation of the screw machine 14 being unnecessary to an understanding of the present disclosure and already well known to those skilled in the art, it is not believed necessary that the same be more completely described or illustrated.

Its turret head 12 is a typical cylindrical turret head of conventional hollow open-cored construction having a plurality of radial sockets designated 16a–16f formed in its cylindrical face 18. Each of said radial sockets is of the same uniform diameter and serve to receive the shank of a tool or its holder for mounting the same on the turret whereby on rotation of the turret about its mounting 15, the tool may be moved into working position with respect to work supported on the chuck 13 of the machine 14. Socket 16f is hidden in FIG. 1 but is indicated in FIGS. 2 and 3. As shown, the radial sockets 16a, 16b, et seq., are arranged in radially opposed pairs and form continuous bores through the turret head 12, allowing the work stock being acted thereon by the cutting tool to pass through the turret head.

In each of radial sockets 16a through 16e a variety of different tools are shown mounted to the turret head 12 in conventional fashion. Thus radial socket 16a is illustrated as utilized to mount a drill and reamer holder 20 to the turret head 12. As illustrated, holder 20 comprises a tool head 22, a supporting body 24, and a tubular mounting shank 26, the latter slidably fitting within radial socket 16a. The supporting body 24 and its tubular mounting shank 26 are formed in one piece. The tool head 22 is locked to the supporting body 24 by means of a pair of machine bolts 27 and has a tubular collar 28 adapted to receive the shoulder of a cutting bit or other tool to be supported thereby. The tool is locked in place by means of a set screw 30 which threadedly engages a suitably threaded opening (not shown) in the lateral wall of the tubular collar 28.

As already mentioned, the tubular mounting shank 26 of the holder 20 slidably fits into the radial socket 16a of the turret head 12 and is locked in place by an internally located cam or other locking element (corresponding to 31 shown in FIG. 3) which is urged into engagement with the tool holder shank 26 by tightening a removable locking bolt 32a into a suitably threaded opening 98 in the exposed annular base 36 of the turret head 12. A drill and reamer holder 40, fragmentarily shown, is similarly shank mounted to the turret head 12 in radial socket 16b and is locked in place by removable locking bolt 32b. Continuing around turret 12 there is illustrated a conventional box tool 50 having a tubular mounting shank 52, a conventional revolving work stop 54 having a cylindrical mounting shank 56, and a conventional knee tool 58 having a tubular mounting shank 60, each of said tools being mounted in a respective radial socket 16c, 16d and 16e and being locked therein by tightening removable locking bolts 32c, 32d, and 32e respectively which threadedly mount in the turret base and act on corresponding cams 31 with which each said sockets is provided.

The thus far described shank mounting of tools 50, 54 and 58 and tool holders 20, 40 in the turret of a lathe or screw machine is conventional and works very satisfactorily. However, on occasion there is need to use the screw machine or turret lathe to work with cutting tools such as a reamer, drills or die which is of a larger size than the tool sizes for which holders 20 and 40 are intended. For these instances, the present invention provides an auxillary holder or adapter above identified generally at 10 and particularly illustrated by FIGS. 1, 2 and 3 as assembled with respect to radial socket 16f.

As illustrated by said views, holder 10 comprises a tool head 70 and a generally L-shaped supporting body 72, the latter having a base portion 74 and a mounting flange 76 which are mutually perpendicular and together comprise an integral one-piece rigid metal structure. The inner surface of the flange portion 76 is formed flat so that it may intimately engage against the flat base 36 of the turret 12 and the base portion 74 of the suporitng body has an enlarged circular opening 78 (FIG. 3) which aligns with the radial socket of the turret head with which it is to be assembled, in this case radial socket 16f and a pair of internally threaded openings 92 (FIG. 2) spaced outwardly from opposite sides of opening 78. As is shown best by FIG. 3, mounting flange 76 is also provided with a suitable opening 96 which aligns with opening 98 in the base wall of the turret head 12 after first removing bolt 32f. With opening 96 in flange 76 aligned with opening 98, bolt 32f may be rethreaded into the opening 98 so as to securely fasten the mounting flange 76 and thereby supporting body 70 of the adapter 10 to turret head 12 and so that opening 78 in its base portion 74 aligns with radial socket 16f. The most stable construction is obtained when base portion 74 rests against the cylindrical face 18 of the turret head in tangential enggaement therewith, the flat side of the flange portion 76 intimately engaging the adjacent side walls of the turret head under the tightened bolt 32f, as described. However, some circumstances it will be advantageous to have base portion 74 spaced off the cylindrical face 18 of the turrent head and this can be conveniently obtained by utilizing a supporting body in which the mounting hole 96 of its flange 76 is appropriately spaced from its base portion 74. Instead of opening 96 having a closed circular shape as illustrated, it may be given a general U-shape which opens into one edge of the flanged portion 76 so that it may be assembled with the turret head by simply loosening bolt 32f to permit the thus bifurcated flange to straddle the bolt shank and so avoids the necessity to completely remove bolt 32f.

As illustrated best by FIG. 2, tool head 70 of adapter 10 includes a pair of ears 71 on opposite sides of opening 78, each containing an opening 90 which align with internally threaded openings 92 in the base portion 74 of the L-shaped supporting body 70. These apertured ears 71 serve as means for receiving the shanks of a pair of machine bolts 88 and thereby to removably fasten tool head 70 to said base portion 74. Tool head 70 generally corresponds to tool head 22 of holder 20 and has a tubular collar corresponding to collar 28 of holder 20. Its tubular collar 80, however, will have a larger internal diameter sufficient to receive the outsize tool which collar 28 of holder 20, for example, will not support. Tool head 70 may, in fact, be the tool head of a holder borrowed from a larger sized turret head or screw machine whose supporting shank is of a diameter too large to be received in radial socket 16. Such a tool head 70, however, may be utilized to support the outsized tool by unbolting it from its supporting shank and rebolting it to base portion 74 of adapter 10.

In FIG. 2 the head of one of the machine bolts 88 is broken away to illustrate that the machine bolts pass through respective "oversize" openings 90 in the apertured ears 71 of the tool head 70 and threadedly engage in respected threaded openings 92 in said base portion 74 of the supporting body 70. Washers 94 conveniently underlie the head of the machine bolts 88 and insure positive engagement of the machine bolts 88 about the margin of the "oversize" openings 90. The use of "oversize" openings 90 permit limited adjustment of the position of the tool head 70 with respect to the radial socket 16f in the turret head 12. However, openings 90 may be sized so as to avoid such movement and thereby accurately locate the tool head and the bore of its tubular housing 90 with aperture 78 in the mounting adapter 10.

By reason of the described structure, it is possible to conveniently assemble tools on the turret which could not otherwise be mounted in holders 20 or 40 and/or have mounting shanks too large to fit within the radial sockets 16. In addition, the construction makes available the full diameter of the radial socket over which the tool head 70 is aligned by the adapter 10. If opening 78 in the base portion 74 of the adapter 10 is therefore of a diameter at least as large or larger than the diameter of the radial socket 16f with which it is aligned, then, tool head 70 may be used to mount a double ended cutting bit in which either or both bits may be of a size up to the diameter of the radial socket. Thus, as illustrated in FIG. 3, the present invention permits using double ended drill bits of sizes considerably greater than could be mounted in the socket 28 of holder 20, for example. Holder 20 is shown in FIG. 3 in phantom lines and its tubular mounting shank is graphically illustrated as 26'. As shown, the base of shank 26' necessarily has an internal diameter considerably less than that of the radial socket 16f. Where the cutting tool mounted in the tubular holder 80 comprises a reamer or a die, the full width of the socket 16f is also available for the passage therethrough of the bar stock as it is machined. In those instances where the machined bar stock is to have a diameter greater than the radial socket 16f, but is not to be a length making it necessary to pass through the turret head, this can also be accommodated by using the appropriately sized tubular holder 80 mounted on an adapter 10 employing the mentioned larger mounting flange 76 which locates the tool head at a distance spaced from the turret head cylindrical face 18 to accommodate the necessary entrance of the bar stock through the tool and its holder 80, but without the bar stock entering the radial socket.

The invention also contemplates that the tool itself may be adapted for flange mounting to the base wall 36 of the turret head 12. In this event rather than being secured within a tool head such as 70, the tool is itself directly bolted or welded to a supporting L-shaped member corresponding generally to member 72 as previously described. Referring therefore now to FIGS. 4 through 6, a box tool indicated generally at 100 is illustrated as constituting a second presently preferred embodiment of this invention. In these views it will be understood that the bar stock (not shown) is fed through the box tool 100 into radial socket 16f with which the tool is supermounted, through the turret head 12 and out radial socket 16c which is diametrically opposite radial socket 16f.

The box tool 100 as shown comprises a tool head 120 and a supporting body 122. Tool head 120 has an enlarged central bore 124 through which bar stock may be fed as before mentioned. An adjustably positioned cutting bit holder 126 is suitably supported in an elongated recess 128 in the outer base of the tool head 120 and is locked in place by means of an integral threaded stem (not shown) which passes through a suitable slot (not shown) in the tool head 120 behind the recess 128 for threaded engagement with a locknut 130. The cutting bit holder 126 is suitably arranged to hold a separate replaceable cutting bit 132. The cutting angle of the cutting bit 132 may be adjusted by means of a conventional adjusting screw 134 threadedly engaging a supporting stud 136 which is suitably mounted to the tool head 120. A first roller 142 is rotatably supported by a first roller block 144 having an integral threaded stud (not shown) which passes through a suitable opening (not shown) in the tool head 120 for threaded engagement with a locknut 146 whereby the first roller block is mounted to the tool head 120. A second roller 148 is rotatably supported by a similar mounted second roller block 150. The arrangement of the various aforementioned elements is conventional and corresponds to box tools which are well known in the art.

In accordance with this invention, however, tool head 120 is characterized by having a horizontal tubular neck portion 158 which protrudes from an integral base portion 160. Preferably neck portion 158 and its base portion 160 are one piece and integral with the tool head 120.

The tool also includes a supporting body 122 comprising a base portion 162 and a flange portion 164 which are mutually perpendicular and preferably of a one piece of rigid metal. Base portion 162 has an enlarged circular opening 166 of a diameter as large as or greater than that of the bore 124.

Preferably base 160 of the tool head 120 is integrally welded to the portion 162 of its supporting body 122 and such that its enlarged central bore generaly aligns with opening 166 and bore 124 through the neck 158 of the tool body 120. Base 162 of the supporting body 122 and base 160 of the tool head 120 may also constitute the same element. However, as illustrated, base 160 of the tool body may be separate from the base portion 162 and removably fastened thereto as by a pair of machine bolts 172 which are readily connected into internally threaded opening 173 in portion 162. In this alternative arrangement if the opening 174 in the base portion 160 are also "oversize," then they will accommodate adjustment of the position of the tool head 120 with respect to radial socket in the turret head 12 over which it is assembled and this is therefore a highly desirable arrangement, and when utilized with washers 178.

Flange 164 is in turn adapted to be bolted to the base wall 36 of the turret head 12 by means of the removable locking bolts 32 as in the first embodiment and has a flat inner surface so that it may intimately engage the surface of the turret base 36. In this instance, also, because of the greater weight of the box tool, it is preferred to use two locking bolts, 32a, and 32f being illustrated in FIGS. 4 and 5 as being used for this purpose. As in the case of the first embodiment, the openings in flange 164 through which bolts 32a and 32f extend may be circular in shape which necessitates first removal of the locking bolts 32 or said openings may be located to interrupt one edge of the mounting flange and so on loosening of said bolts 32 they may be simply slipped beneath the heads of the bolts and the bolts then retightened.

It will be understood that bore 124 of the box tool 100 may be of any convenient diameter which will accommodate bar stock to be fed into the box tool 100 and up to the diameter of the radial socket 16f when it is required that the bar stock feed through the turret head. The opening 166 in the base portion 162 of the supporting body 122 should also be sufficiently large to accommodate adjustment of the position of the tool head 120 with respect to the turret head 12 as aforementioned and at the same time avoiding an interference of the supporting body 122 with the bar stock being fed through the bore 124.

It should be understood also that the tool holder 10 and the box tool 100 have been described above solely by way of examples to illustrate the invention and that a great variety of different tools and tool holders may be constructed in accordance with the invention following the teachings demonstrated above. Furthermore it will be apparent that numerous changes within the scope of this invention will be suggested by the present disclosure to those skilled in the art, and accordingly, the scope of the invention will be determined by the claims which follow.

Having described my invention, I claim:

1. Tool accessory for use with a machine tool turret having radial sockets in the face thereof which receive the shank of a tool or its holder and associated locking bolts which may be tightened to lock said shank within the socket, said tool accessory comprising a rigid, generally L-shaped supporting body having a base portion and a rigidly united offset mounting flange portion each with a flat inner surface disposed in a plane substantially at right angles to the plane of the flat inner surface of the other portion, and an upstanding tool head fixed on the outer side of the base portion of the supporting body, said upstanding tool head and base protion of the supporting body having a tool or work receiving opening therethrough of an internal diameter greater than that of the radial socket of the machine tool turret with which the accessory is used, the accessory being flange portion resting inner flat surface of the mounting flange portion resting on the exposed face of the machine tool turret and the inner flat surface of the base portion overlying the face thereof, said mounting flange portion having a bolt receiving dimensioned to receive the shank of one of said locking bolts when loosed from the machine tool turret, said bolt receiving opening being so related to the tool or work receiving opening of the base portion that the tool or work receiving opening aligns with one of the radial sockets of the machine tool turret when its associated locking bolt is received in said opening of the mounting flange portion and the locking bolt is tightened to firmly hold the flat inner surface of the mounting flange portion against the exposed face of the machine tool turret, the base portion of the support body being clear of the radial socket.

2. A tool accessory as claimed in claim 1 wherein the tool head is separable from the base portion of the supporting body and has a pair of oppositely disposed aperture-containing ears, the base portion having internally threaded openings on opposite sides of its tool or work receiving opening which align with the apertures of the ear portions of the tool head, the facing surfaces of said ears of the tool head and base portion of the supporting body being flat, and bolts extending through the apertures of said ear portions and threadedly connected into said threaded openings of the base portion of the supporting body.

3. A tool accessory as claimed in claim 2 wherein the apertures of the ear portions have a diameter greater than the diameter of the shank of the bolts which extend therethrough, the tool head having limited adjustment of the axial alignment of its tool or work receiving opening with the corresponding opening of the base portion of the supporting body.

4. A tool accessory as claimed in claim 1 wherein said mounting flange portion is adapted to be bolted to the exposed base of the machine tool turret by said mentioned locking bolt and a second locking bolt.

5. A tool accessory as claimed in claim 2 or 4, wherein the inner flat surface of the base portion is spaced off the face of the machine tool turret.

6. A tool accessory as claimed in claim 1, 2 or 4, wherein the inner flat suface of the base portion has at least tangential contact with the face of the machine tool turret.

References Cited

UNITED STATES PATENTS

| 740,641 | 10/1903 | Glover | 29—57 XR |
| 2,265,487 | 12/1941 | Koski | 82—35 |

FOREIGN PATENTS 525,077    8/1940    Great Britain.

LEONIDAS VLACHOS, Primary Examiner

U.S. Cl. X.R.

29—57; 82—35

PO-1050
(5/69)

UNITED STATES PATENT OFFICE
CERTIFICATE OF CORRECTION

Patent No. 3,543,618      Dated December 1, 1970

Inventor(s) R.A. Holden

It is certified that error appears in the above-identified patent and that said Letters Patent are hereby corrected as shown below:

| | |
|---|---|
| Column 1, line 11, (Abstract line 1) | Change "latches" to --lathes--. |
| Column 1, line 21 | Change "latches" to --lathes--. |
| Column 7, line 20, (Claim 1, line 1) | Insert --A-- before "tool". |
| Column 7, line 35, (Claim 1, line 16) | Change "flange portion resting" to --positionable with the--; |
| Column 7, line 40, (Claim 1, line 21) | After "ceiving" insert --opening |
| Column 8, line 28, (Claim 5, line 1) | Before "2" insert --1,--; Change "claim" to --claims--. |
| Column 8, line 31, (Claim 6, line 1) | Change "claim" to --claims--. |

SIGNED AND
SEALED
MAR 2 1971

(SEAL)
Attest:

Edward M. Fletcher, Jr.
Attesting Officer

WILLIAM E. SCHUYLER, JR
Commissioner of Patents